United States Patent
Carlson

[15] 3,666,817
[45] May 30, 1972

[54] TETRAKIS (HYDROXYMETHYL) PHOSPHONIUM CHLORIDE FROM PHOSPHINE AND FORMALDEHYDE

[72] Inventor: Ronald H. Carlson, Lewiston, N.Y.

[73] Assignee: Hooker Chemical Corporation, Niagara Falls, N.Y.

[22] Filed: July 13, 1970

[21] Appl. No.: 54,574

[52] U.S. Cl. .................................................. 260/606.5 F
[51] Int. Cl. .................................................. C07f 9/02
[58] Field of Search ................................... 260/606.5 F

[56] References Cited

UNITED STATES PATENTS 3,243,450    3/1966    Grayson .......................... 260/606.5

*Primary Examiner*—Daniel E. Wyman
*Assistant Examiner*—Werten F. W. Bellamy
*Attorney*—Peter F. Casella, Donald C. Studley, Richard P. Mueller, James F. Mudd and William J. Schramm

[57] ABSTRACT

A process is described for the preparation of tetrakis(hydroxymethyl) phosphonium chloride (THPC) by a direct two-step process of reacting phosphine and excess formaldehyde under pressure of from about 4 to about 15 atmospheres at a temperature of from 25° to 70° C., whereby a tris(hydroxymethyl) phosphine hemiacetal solution is obtained which is then treated with hydrochloric acid to produce the phosphonium chloride.

7 Claims, No Drawings

TETRAKIS (HYDROXYMETHYL) PHOSPHONIUM CHLORIDE FROM PHOSPHINE AND FORMALDEHYDE

BACKGROUND OF THE INVENTION

A process has been described for the preparation of tri-(oxymethyl) phosphine by reacting phosphine with paraformaldehyde under pressure of about 40 atmospheres and at 80° to 100° C. (U.S.S.R. patent 136, 617 – 1960). It also has been demonstrated that in the absence of a catalyst formaldehyde reacts with phosphine under a pressure of 150 to 300 millimeters of mercury at 40° to 80° C. to produce tetra(hydroxymethyl) phosphonium hydroxide (Raver et al., Zh. Ob. Khim, Vol. 32, No. 2, pages 558–590, 1962). These references do not show the appreciation of a valuable intermediate, tris(hydroxymethyl) phosphine hemiacetal which can be reacted under acidic or basic conditions to produce varying materials such as THPC (registered trademark of Hooker Chemical Corporation for tetrakis(hydroxymethyl) phosphonium chloride), or THPO.

DESCRIPTION OF PREFERRED EMBODIMENTS

It is an object of this invention to produce with relatively simple and economical materials, a valuable chemical compound, tetrakis(hydroxymethyl) phosphonium chloride (THPC).

The invention is concerned with a two-step process as is described below by reaction sequences 1–2.
1. Phosphine + formaldehyde (aqueous) → tris(hydroxymethyl) phosphine hemiacetal.
2. tris(hydroxymethyl) phosphine hemiacetal → acidic conditions; THPC.

In the first reaction sequence, an uncatalyzed pressure reaction takes place. The amount of formaldehyde is in excess of the amount of added phosphine, preferably from about 3 to about 5 moles per mole of phosphine and even more preferably about 4 moles per mole of phosphine. The pressure employed in the first reaction sequence is above atmospheric, preferably from about 4 to about 15 atmospheres, and even more preferably about 7 to about 10 atmospheres. The temperature employed in the first reaction sequence ranges from about 0° to 150° C., preferably 25° to 70° C. and even more preferably about 40° to about 60° C.

Because of the occurrence of slow oxidation to tris(hydroxymethyl) phosphine oxide, the tris(hydroxymethyl) phosphine hemiacetal should be used as soon as possible in order to prepare the desired THPC product.

In the second reaction sequence above, the temperature employed ranges from about 0° to 150° C., preferably about 25° to about 70° C., and even more preferably about 25° to 45° C. In order to produce the desired phosphonium chloride, hydrochloric acid (HC1) is the preferred source of chloride ion. The amount of hydrochloric acid employed preferably should be stoichiometric to the amount of tris(hydroxymethyl) phosphine hemiacetal present, although higher than stoichiometric amounts may be used. The pH of the resulting acidified solution should range from about 0 to about 3.

Having described the invention in general, below are examples which will permit one of ordinary skill in the art to operate the invention. All temperatures are in degrees centigrade and all percentages are percentages by weight unless otherwise indicated.

EXAMPLE 1

Preparation of Tris(Hydroxymethyl) Phosphine Hemiacetal seven hundred fifty grams of fresh 37 percent formaldehyde aqueous solution is charged into a nitrogen purged 1 liter autoclave and heated to 40° C. The system is then pressurized with phosphine to 145 pounds per square inch with stirring. As phosphine is used up and pressure drops to 100 pounds per square inch, fresh phosphine is added to 145 psi. This cycle is repeated until phosphine is no longer absorbed at a practical rate. Upon termination of the reaction (approximately 90 minutes), unreacted phosphine is vented and the system purged with nitrogen. The resulting tris(hydroxymethyl) phosphine hemiacetal solution contained 9.37 percent trivalent phosphorus as measured by iodine titration. The pH of the solution was 8.5. The solution was pale yellow in color and effervescing slightly, indicating oxidation to phosphine oxide to be occurring accompanied by hydrogen evolution.

EXAMPLE 2

The age of the formaldehyde solution has a great effect on the production of trishydroxymethyl phosphine hemiacetal. For example, if the age is approximately 11 days, the moles of phosphine consumed in the reaction with formaldehyde are 2.5 whereas the moles of unreacted formaldehyde are 1.7. This ratio increases when the age of the solution is about 5 months old wherein the moles of phosphine consumed are 1.07 while the moles of unreacted formaldehyde are 6.03. This clearly indicates that the phosphine consumption decreases considerably in the reaction with formaldehyde reagent. This is attributable to an increase in formaldehyde polymerization with aging.

EXAMPLE 3

Preparation of THPC

One hundred grams of tris(hydroxymethyl) phosphine hemiacetal, 48 hours old, was used in the preparation of THPC. During the 48 hours since the preparation of the starting material, the trivalent phosphorus content in solution had dropped from 9.37 to 8.65 percent. The average hemiacetal composition of this solution was calculated to be $P(CH_2OH)_3 \cdot 0.82\ HCHO$ or conversely 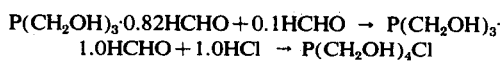. The mole ratio of "hemiacetal formaldehyde" to tris (hydroxymethyl) phosphine was thus 0.82 to 1. To convert tris (hydroxymethyl) phosphine hemiacetal to THPC, formaldehyde and stoichiometric hydrochloric acid were added according to the equation below.

$$P(CH_2OH)_3 \cdot 0.82 HCHO + 0.1 HCHO \rightarrow P(CH_2OH)_3 \cdot 1.0 HCHO + 1.0 HCl \rightarrow P(CH_2OH)_4Cl$$

To the tris(hydroxymethyl) phosphine hemiacetal solution (containing 0.28 moles of tris(hydroxymethyl) phosphine) was added 4 grams (0.05 moles) of 37.4 percent formaldehyde solution (Baker reagent) followed by 27.2 grams (0.28 moles) of 37.5 percent HC1. Addition of concentrated HCl caused a mild exotherm thereby raising the temperature from 25° centigrade to 43° C. The acidified solution was placed into a Rinco evaporator and stripped over a steam bath at 10 to 15 millimeters of mercury for 3 hours. The stripped solvent was collected in a dry ice trap and was primarily water and methanol. After stripping, the product present was a thick oil which upon cooling solidified into a very thick wax. A quantitative yield was obtained. The product was identified as tetrakis(hydroxymethyl) phosphonium chloride, having a pH of a 1 percent solution of 2.86. The percentage of phosphorus by iodine titration was determined to be 15.84 percent. The IR spectrum was the same as that of material commercially produced.

The above example indicates that high quality (assay 97.6 percent) THPC can be obtained from tris(hydroxymethyl) phosphine hemiacetal solution. The two minor impurities present in the product are THPO, which results from a premature oxidation of the solution and ethanol, which was added as a stabilizer to the formaldehyde solution. Freshly prepared tris(hydroxymethyl) phosphine hemiacetal solution and nonstabilized formaldehyde would lead to essentially pure THPC.

It is understood that the following claims are intended to cover all of the generic and specific features of the invention herein described and all statements of the scope of the invention which, as a matter of language, can be said to fall therebetween.

I claim:

1. A process for preparing tetrakis(hydroxymethyl) phosphonium chloride comprising the steps:
   1. reacting phosphine with formaldehyde in the presence of water at a pressure of greater than atmospheric and a temperature of from about 0° to about 150° C.; and
   2. treating the resulting solution with hydrochloric acid.

2. The process of claim 1 wherein the pressure employed in step 1 is from about 4 to about 15 atmospheres.

3. The process of claim 1 wherein the temperature employed in step 1 is from 25° to 70° C.

4. The process of claim 1 wherein the temperature employed in step 2 is from about 25° to about 70° C.

5. The process of claim 1 wherein the pH of the solution of step 2 is from about 0 to about 3.

6. The process of claim 1 wherein the amount of formaldehyde ranges from about 3 to about 5 moles per mole of phosphine.

7. The process of claim 6 wherein the amount of formaldehyde employed is about 4 moles per mole of phosphine.

* * * * *

PO-1050
(5/69)

UNITED STATES PATENT OFFICE
CERTIFICATE OF CORRECTION

Patent No. 3,666,817          Dated May 30, 1972

Inventor(s)          Ronald H. Carlson

It is certified that error appears in the above-identified patent and that said Letters Patent are hereby corrected as shown below:

In the Abstract line 2, delete "(THPC)". Column 1, line 18 cancel beginning with "THPC" to and including "for" in line 19; line 20, delete ")"; line 26, delete "(THPC)"; line 32, delete "THPC" and insert --- tetrakis(hydroxymethyl)phosphonium chloride---; line 47, delete "THPC". Column 2, line 26, line 29 and line 63, each occurrence, delete "THPC", and insert in its place ---tetrakis(hydroxymethyl)phosphonium chloride---.

Signed and sealed this 28th day of November 1972.

(SEAL)
Attest:

EDWARD M. FLETCHER, JR.           ROBERT GOTTSCHALK
Attesting Officer          Commissioner of Patents